May 2, 1939.  R. H. SULLIVAN  2,156,708
DIRECT CURRENT CONVERTER SYSTEM
Filed June 10, 1938
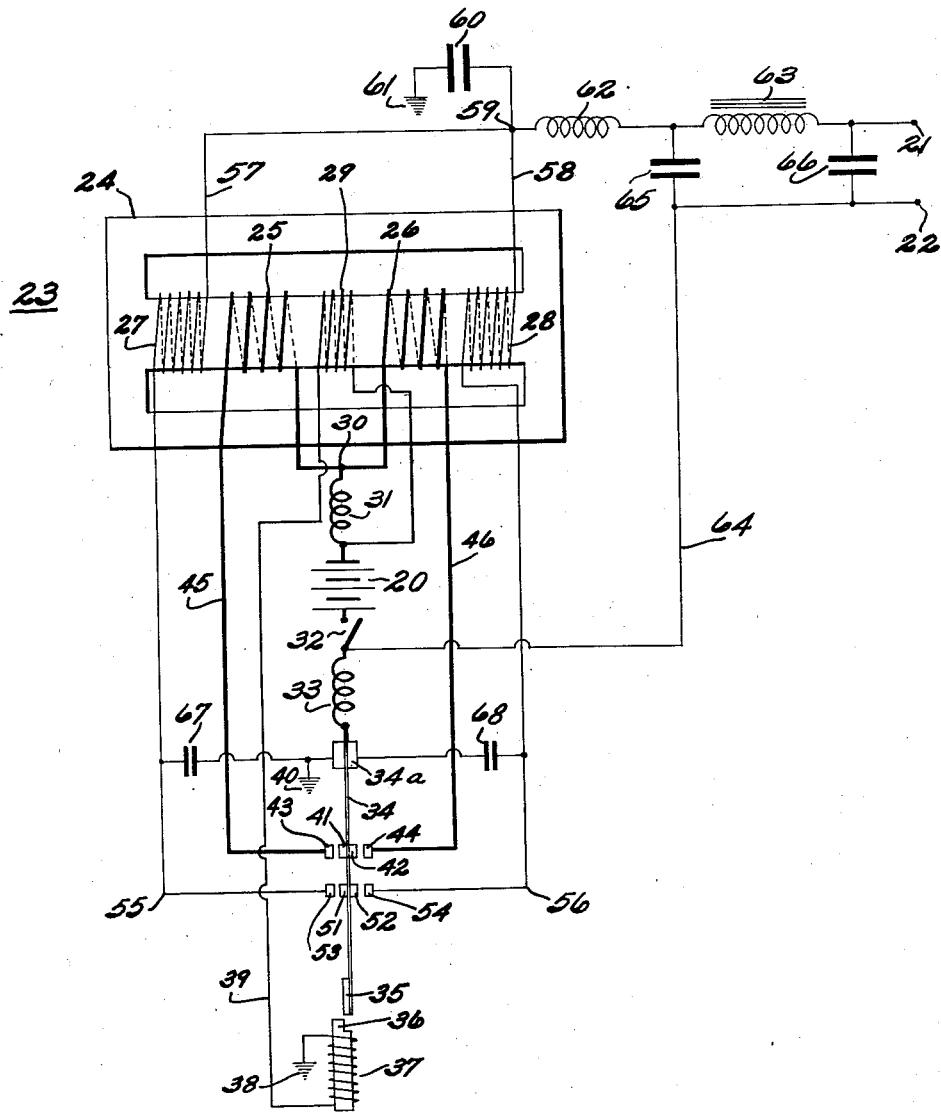
INVENTOR
Raymond H. Sullivan
BY
Spencer Hardman & Fehr
ATTORNEYS Patented May 2, 1939

2,156,708

UNITED STATES PATENT OFFICE 2,156,708

DIRECT CURRENT CONVERTER SYSTEM

Raymond H. Sullivan, Rochester, N. Y., assignor to General Motors Corporation, Detroit, Mich., a corporation of Delaware Application June 10, 1938, Serial No. 212,962

2 Claims. (Cl. 125—365)

This invention relates to a system of conversion of direct current to higher voltages, the current either direct or alternating. Such systems of conversion employ a vibrator operated by an electromagnet from the source of direct current. This vibrator cooperates with the D. C. source and with a transformer having primary windings and secondary windings. The vibrator operates alternately to connect one of the primary windings with the current source, thereby causing voltages to be induced in the secondary windings at a value dependent upon the ratio of the number of turns of the secondary to the number of turns of the primary. The voltages of the transformer secondaries may be rectified to provide unidirectional current at relatively high voltages or the secondary voltages may remain unrectified to provide alternating current. Rectification of the secondary voltages is usually obtained either by a thermionic tube or by rectifying contacts operated by the vibrator in synchronism with the control of the primary circuit.

It has been the practice heretofore to control the electromagnet which operates the vibrator through a pair of contacts, one of which is actuated by the vibrator. It is an object of the present invention to dispense with the use of contacts for controlling the vibrator electromagnet. In the disclosed embodiment of the present invention this object is accomplished by providing the transformer with a control winding which is connected in series with the electromagnet and D. C. source and which is so wound that a primary circuit closure resulting from movement of the vibrator toward the electromagnet effects the induction of the voltage in the control winding opposing the voltage of the D. C. source and, that a primary circuit closure resulting from the movement of the vibrator away from the electromagnet effects the induction of the voltage in the control winding aiding the voltage of the D. C. source quickly to reenergize the electromagnet.

Further objects and advantages of the present invention will be apparent from the following description, reference being had to the accompanying drawing wherein a preferred embodiment of the present invention is clearly shown.

In the drawing:

The figure of the drawing is a wiring diagram disclosing an embodiment of the invention.

Referring to the diagram, 20 designates a storage battery as a source of direct current. The terminals 21 and 22 are the output terminals of the converter from which current at a higher voltage than the battery 20 may be obtained. 23 designates a transformer which comprises a core 24, primary windings 25 and 26, secondary windings 27 and 28 and a control winding 29. Primary windings 25 and 26 have a center tap 30 preferably connected thru an inductance or choke 31 to one terminal of the battery 20. The outer ends of the primary windings 25 and 26 are connected to stationary contacts 43 and 44, respectively, by wires 45 and 46, respectively. Contacts 43 and 44 are alternately engageable with movable contacts 41 and 42 respectively carried by a resilient reed or contact carrying member 34 preferably of spring steel and having its fixed end attached to a metallic block 34a. Thus the contacts 41 and 42 are electrically connected with the block 34a. The reed 34 is normally unbiased so that its contacts 41 and 42 are normally in disengaged position. The reed 34 is preferably connected to ground at 40 and is connected to the other terminal of the battery 20 through a switch 32 and preferably through an inductance or choke 33. The free end of the vibrator 34 carries an armature 35 located off center with respect to a magnet core 36 surrounded by the vibrator electromagnet coil 37, one end of which is grounded at 38 and the other end of which is connected by wire 39 with control winding 29 which is connected with battery 20.

The ends of secondary windings 27 and 28 are connected to stationary contacts 53 and 54 respectively by wires 55 and 56. Contacts 53 and 54 are alternately engageable with contacts 51 and 52 respectively carried by the reed 34 and electrically connected therewith. The secondaries 27 and 28 are connected respectively by wires 57 and 58 with a center tap 59 which is connected with ground 61 through a condenser 60 and which is connected with the output terminal 21 through a radio frequency choke 62 and an audio frequency choke 63. The reed 34 is connected through the choke 33 and wire 64 with the output terminal 22. Condensers 65 and 66 respectively connect the ends of choke 63 with the output lead wire 64. The chokes 62 and 63 and the condensers 60, 65 and 66 constitute a filter.

Condensers 67 and 68 respectively shunt pairs of contacts 51, 53 and 52, 54, and are connected in series with a center tap to ground 40.

The gaps between the primary contacts 41, 43 and 42, 44 are preferably adjusted so that they are normally less than the normal gaps between the secondary contacts 51, 53 and 52, 54. This is desired in order that the primary circuit may be closed before and opened after the secondary circuit.

In the operation of the device, the resilient reed 34 is normally unbiased so that the pairs of primary and secondary contacts are normally disengaged. When the switch 32 is closed, the electromagnet 37 is energized through the following circuit: battery 20, switch 32, choke 33, ground 40, ground 38, electromagnet coil 37, wire 39, transformer control winding 29 and battery 20. This causes the electromagnet to be energized and the armature 35 is attracted toward the left, thereby causing primary contacts 41 and 43 to be engaged and then secondary contacts 51 and 53 to be engaged. When contacts 41 and 43 are closed, current flows through section 25 of the primary winding and creates a flux that induces a potential in the secondary winding 27. This secondary potential is applied to the output terminal 21 through the center tap 59 and to the output terminal 22 through the contacts 51 and 53.

When the battery circuit is first closed by closing the switch 32, the only voltage impressed on the vibrator coil 37 is the voltage of the battery 20, there being no magnetic flux then in the transformer core 24 and no voltage generated in the control coil 29. However, when a flux is produced in the core of the transformer, a potential will be induced in the control winding 29 which is so wound that the potential induced therein will be counter to the battery potential. Therefore, the voltage impressed on the coil 37 will be minimized and the armature 35 will be released, thereby permitting the reed 34 to move toward the right. However, the reed 34 will not stop at its normal unbiased position, but, due to its own momentum, it will continue to move until contact 42 engages contact 44 and contact 52 engages contact 54. This effects connection of the battery with the primary section 26, thereby creating a flux of opposite sign which causes a potential to be induced in the secondary section 28 which is so wound as to impress upon the output terminals 21 and 22 following the closing of contacts 52 and 54, a potential of the same sign as that impressed by the secondary section 27 when contacts 51 and 53 are closed. When a flux is being created by current flow through the transformer primary section 26, which is the reverse in sign with respect to that produced by transformer primary section 25, the voltage induced in transformer control winding 29 will be opposite in sign to that which was induced in it when transformer primary section 25 was energized. Therefore, the potential of coil 29 will aid the battery potential in charging the electromagnet coil 37, thereby vigorously effecting movement of the reed toward the left so that the cycle of operations will be repeated as long as the switch 32 remains closed.

It has been found that, unless some means are provided for the prevention of sparking at the contacts and for the improvement of the efficiency of the device, that sparking is detrimental to the life and operation of the system and that its efficiency is considerably reduced. Hence the condensers 67 and 68 have been provided, each condenser being connected from the reed 34 to a secondary contact and to the end of a secondary section. Condensers 67 and 68 should have the proper capacity value such as to bring the points of zero current value of the secondary current into synchronism with the points of interruption of the primary current, or to adjust the time constant of the secondary circuit into synchronism with respect to that of the primary circuit. The value of condenser capacity is chosen which most nearly effects the desired ultimate result of eliminating sparking at the contacts and improving the efficiency of the system. The manner in which the condensers 67 and 68 operate to reduce contact sparking and to increase the efficiency of the system is set forth in detail in the copending application of Sullivan et al. Serial No. 699,522 filed November 24, 1933.

Furthermore, condensers 67 and 68, connected in this manner, provide a by-pass or conducting path for reducing, and tending to eliminate high and radio frequency currents from the secondary circuits as well as from the primary circuits when the primary circuits are closed. These high and radio frequency currents will by-pass to ground at 40. The leads from these condensers are made as short as possible to increase the effectiveness of this by-passing action and to prevent radiation therefrom.

While the embodiment of the present invention as herein disclosed, constitutes a preferred form, it is to be understood that other forms might be adopted, all coming within the scope of the claims which follow.

What is claimed is as follows:

1. A D. C. converter system comprising a source of direct current, a transformer having primary windings and secondary windings, a vibrator for connecting the D. C. source alternately with the primary windings, an electromagnet for operating the vibrator, and a winding on the transformer for controlling the energization of the electromagnet.

2. A D. C. converter system comprising a source of direct current, a transformer having primary windings and secondary windings, a vibrator for connecting the D. C. source alternately with the primary windings, an electromagnet for operating the vibrator, and a control winding on the transformer connected in series with electromagnet and D. C. source and so wound that a primary circuit closure resulting from movement of the vibrator toward the electromagnet effects the induction of a voltage in the control winding opposing the voltage of the D. C. source and, consequently, that a primary circuit closure resulting from movement of the vibrator away from the electromagnet effects induction of a voltage in the control winding aiding the voltage of the D. C. source.

RAYMOND H. SULLIVAN.